US009069356B2

(12) United States Patent
Papaefstathiou et al.

(10) Patent No.: US 9,069,356 B2
(45) Date of Patent: Jun. 30, 2015

(54) NOMADIC SECURITY DEVICE WITH PATROL ALERTS

(75) Inventors: Efstathios Papaefstathiou, Redmond, WA (US); Russell Sanchez, Seattle, WA (US); Nathaniel T. Clinton, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 581 days.

(21) Appl. No.: 13/158,445

(22) Filed: Jun. 12, 2011

(65) Prior Publication Data

US 2012/0313779 A1 Dec. 13, 2012

(51) Int. Cl.
*G08B 13/00* (2006.01)
*G05D 1/02* (2006.01)
*G05D 1/00* (2006.01)

(52) U.S. Cl.
CPC ............ *G05D 1/0274* (2013.01); *G05D 1/0038* (2013.01); *G05D 1/0238* (2013.01); *G05D 1/0242* (2013.01); *G05D 1/0255* (2013.01); *G05D 1/027* (2013.01); *G05D 1/0278* (2013.01); *G05D 2201/0209* (2013.01)

(58) Field of Classification Search
None
See application file for complete search history.

(56) References Cited

U.S. PATENT DOCUMENTS

| 7,228,203 | B2 | 6/2007 | Koselka et al. |
| 7,750,803 | B2 | 7/2010 | Matsuhira et al. |
| 2004/0113777 | A1* | 6/2004 | Matsuhira et al. ............ 340/541 |
| 2005/0075116 | A1* | 4/2005 | Laird et al. ................. 455/456.3 |
| 2005/0216126 | A1* | 9/2005 | Koselka et al. ............... 700/259 |
| 2005/0221840 | A1* | 10/2005 | Yamamoto et al. ........ 455/456.3 |
| 2006/0047361 | A1* | 3/2006 | Sato et al. ..................... 700/245 |
| 2006/0049940 | A1* | 3/2006 | Matsuhira et al. ............ 340/541 |
| 2007/0192910 | A1* | 8/2007 | Vu et al. .......................... 901/17 |
| 2008/0143064 | A1* | 6/2008 | Won .............................. 280/5.22 |
| 2012/0126975 | A1* | 5/2012 | Gonzales ...................... 340/540 |

OTHER PUBLICATIONS

Bradshaw, Alan, "The UK Security and Fire Fighting Advanced Robot Project", Retrieved at << http://ieeexplore.ieee.org/stamp/stamp.jsp?tp=&arnumber=181445 >>, IEE Colloquium on Advanced Robotic Initiatives, Apr. 17, 1991, p. 1-4.

Guo, et al., "Towards Collaborative Robots for Infrastructure Security Applications", Retrieved at << http://citeseerx.ist.psu.edu/viewdoc/download?doi=10.1.1.89.728&rep=rep1&type=pdf >>, Proceedings of the International Symposium on Collaborative Technologies and Systems, 2004, pp. 6.

Chang, et al., "Development of a Patrol Robot for Home Security with Network Assisted Interactions", Retrieved at << http://ieeexplore.ieee.org/stamp/stamp.jsp?tp=&arnumber=4421116 >>, SICE Annual Conference, Sep. 17-20, 2007, p. 924-928.

(Continued)

*Primary Examiner* — Ojiako Nwugo
(74) *Attorney, Agent, or Firm* — Julie Kane Akhter; Peter Taylor; Micky Minhas

(57) ABSTRACT

There is provided a device such as a robot that includes a processor and a number of sensors. Each of the sensors provides respective sensor data to the processor. The sensor data from each sensor is indicative of corresponding characteristics of an environment of the device. A memory includes a security mode component that is executable by the processor and is configured to cause the device to autonomously navigate at least a portion of the environment. A detection component executable by the processor is configured to detect an unusual condition in the environment.

20 Claims, 5 Drawing Sheets

(56) References Cited

OTHER PUBLICATIONS

Li, et al., "An Autonomous Surveillance and Security Robot Team", Retrieved at << http://ieeexplore.ieee.org//xpls/abs_all.jsp?arnumber=4531425 >>, IEEE Workshop on Advanced Robotics and Its Social Impacts, Dec. 9-11, 2007, pp. 6.

Guo, et al., "Monitoring the Home Environment Using Domestic Robot", Retrieved at << http://grouplab.cpsc.ucalgary.ca/grouplab/uploads/Publications/Publications/2007-MonitoringHome.GIPoster.pdf >>, Adjunct Proc. Graphics Interface, May 28-30, 2007, pp. 3.

Miskon, et al., "Mapping Normal Sensor Measurement Using Regions", Retrieved at << http://ieeexplore.ieee.org/xpls/abs_all.jsp?arnumber=4939652 >>, IEEE International Conference on Industrial Technology, Feb. 10-13, 2009, pp. 6.

* cited by examiner

200

400

NOMADIC SECURITY DEVICE WITH PATROL ALERTS

BACKGROUND

Security systems are widely used to monitor and detect unauthorized entry into a building or other premises. Contemporary security systems typically utilize a variety of components, such as cameras, motion sensors, and the like, that are installed in selected locations throughout the building or premises in such a way so as to achieve a desired level of security. Typically, one or more security system components are associated with each area of the premises that is desired to be monitored. Accordingly, a security system designed to provide a given premises with a reasonable or moderate level of security may require a relatively small number of security system components associated with certain vulnerable entrance or exit points of the premises, such as ground-level windows, a back door, a rear entrance gate and the like. Conversely, a security system designed to provide the same premises with a relatively high-level of security may require a significantly greater number of security system components dispersed throughout various portions of the premises in order to enable the system to monitor additional portions of the premises. Similarly, as the size of the monitored premises increases a greater number of security system components may generally be required to be dispersed throughout the premises in order to achieve a given level of security.

Thus, it is noted that there is a general correspondence between the desired level of security and the number of security system components required to be dispersed at different locations throughout the premises in order for a security system to achieve the desired level of security. In other words, for a given premises, a higher level of security requires that a greater number of security system components be dispersed at a greater number of different locations throughout the premises. However, security system components may be negatively perceived by visitors or other people present on or near the premises. For example, a facility having numerous visible security system components may be perceived as an intrusive or unfriendly environment, or as being located in a dangerous or unsafe area. Further, as noted above, a security system having the capability to monitor numerous locations of a premises requires a correspondingly greater number of components, and is therefore also likely to be relatively costly and complex.

SUMMARY

The following is a brief summary of subject matter that is described in greater detail herein. This summary is not intended to be limiting as to the scope of the claims. It is intended to neither identify key elements of the claimed subject matter nor delineate the scope of the subject innovation. Its sole purpose is to present some concepts of the claimed subject matter in a simplified form as a prelude to the more detailed description that is presented later.

The claimed subject matter generally provides a device including a processor and a number of sensors. Each of the sensors provides respective sensor data to the processor. The sensor data from each sensor is indicative of corresponding characteristics of an environment of the device. A memory includes a security mode component that is executable by the processor and is configured to cause the device to autonomously navigate at least a portion of the environment. A detection component executable by the processor is configured to detect an unusual condition in the environment.

Another embodiment of the claimed subject matter relates to one or more computer-readable storage media containing code that, when executed by a processor of an autonomous device, cause an autonomous device to navigate along one or more navigation paths to various locations within an environment, and to sense characteristics of the environment at each of the locations. The computer-readable medium also includes code that, when executed by a processor of the autonomous device, cause the autonomous device to compile expected values and ranges of values for each of the sensed characteristics, and to detect an unusual condition based at least in part upon a comparison between the characteristics currently sensed at a particular location and the compiled expected value or range of values for the characteristics at that particular location. The computer-readable storage media also include code that, when executed by a processor of the autonomous device, further cause the autonomous device to respond to the detection of an unusual condition by sending a notification of the detected unusual condition to thereby alert a remote user.

Yet another embodiment of the claimed subject matter relates to a method of monitoring an environment that includes providing a robot carrying a number of sensors along a navigation path within the environment. The sensors sense characteristics of the environment at various locations along the navigation path. The method detects an unusual condition based at least in part upon a comparison between the characteristics currently sensed at a particular location and an expected value or range of values for the characteristics at that particular location. The method further responds to the detection of an unusual condition by sending to a user a notification of the detected unusual condition.

DETAILED DESCRIPTION

Figure 1:
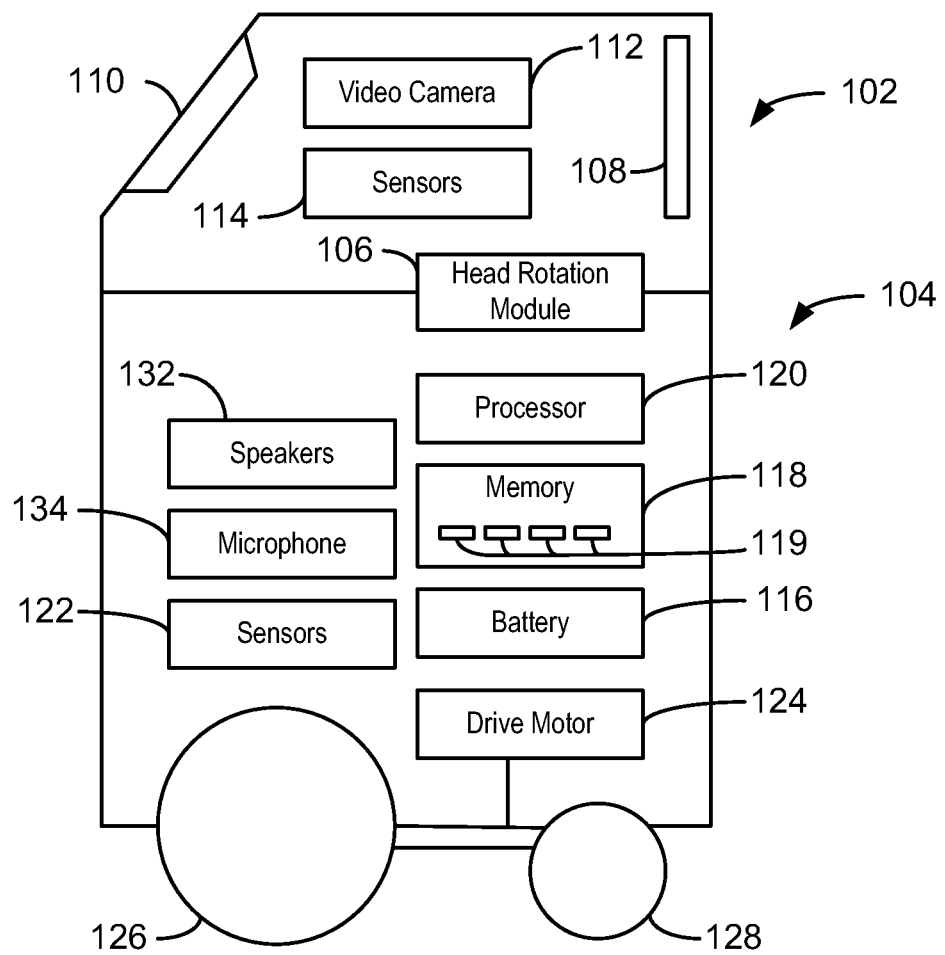
FIG. 1 is a block diagram of an autonomous device embodying the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

FIG. 1 is a block diagram of a robotic device or "robot" 100 capable of communicating with a variety of remotely-located devices, including remote computing devices, cellular telephones, and the like, by way of a network connection. A "robot", as the term will be used herein, is an electro-mechanical machine that includes computer hardware and software that causes the robot to perform a variety of functions independently and without assistance from a user, in response to a user request, or under the control of a user.

The robot 100 can include a head portion 102 and a body portion 104, wherein the head portion 102 is movable with respect to the body portion 104. The robot 100 can include a head rotation module 106 that operates to couple the head portion 102 with the body portion 104, wherein the head rotation module 106 can include one or more motors that can cause the head portion 102 to rotate with respect to the body portion 104. As an example, the head rotation module 106 may rotate the head portion 102 with respect to the body portion 104 up to 45° in any direction. In another example, the head rotation module 106 can allow the head portion 102 to rotate 90° in relation to the body portion 104. In still yet another example, the head rotation module 106 can facilitate rotation of the head portion 102 180° with respect to the body portion 104. The head rotation module 106 can facilitate rotation of the head portion 102 with respect to the body portion 102 in either angular direction.

The head portion 102 may include an antenna 108 that is configured to receive and transmit wireless signals. For instance, the antenna 108 can be configured to receive and transmit Wi-Fi signals, Bluetooth signals, infrared (IR) signals, sonar signals, radio frequency (RF) signals, or other suitable signals. Further, the antenna 108 can be configured to receive and transmit data to and from a cellular tower and to communicate with a remotely-located computing device (not shown) using the antenna 108.

The head portion 102 of the robot 100 also includes one or more display systems 110 configured to display information to an individual that is proximate to the robot 100. A video camera 112 disposed on the head portion 102 may be configured to capture video of an environment of the robot 100. In an example, the video camera 112 can be a high definition video camera that facilitates capturing video data that is in, for instance, 720p format, 720i format, 1080p format, 1080i format, or other suitable high definition video format. The video camera 112 can be configured to capture relatively low resolution data in a format that is suitable for transmission to the remote devices by way of the antenna 108. The video camera 112 can also be configured to capture video in a variety of ambient lighting conditions, including low-light conditions or with night-vision capabilities. As the video camera 112 is mounted in the head portion 102 of the robot 100, through utilization of the head rotation module 106, the video camera 112 can be configured to capture live video data of a relatively large portion of an environment of the robot 100.

The robot 100 may further include one or more sensors 114. The sensors 114 may include any type of sensor that can aid the robot 100 in performing autonomous or semi-autonomous navigation and/or environmental monitoring. For example, these sensors 114 may include a depth sensor, an infrared sensor, a camera, a temperature sensor, a microphone or similar audio sensor and/or audio recorder, a sonar sensor, temperature sensor, humidity sensor, smoke sensor, a cliff sensor that is configured to detect a drop-off in elevation proximate to the robot 100, a GPS or other location sensor, an accelerometer, a gyroscope, or other types of suitable sensors.

The body portion 104 of the robot 100 may include a battery 116 that is operable to provide power to all the components and modules carried by the robot 100. The battery 116 may be, for instance, a rechargeable battery. In such a case, the robot 100 may include an interface that allows the robot 100 to be coupled to a power source, such that the battery 116 can be recharged.

The body portion 104 of the robot 100 can also include one or more computer-readable storage media, such as memory 118. A number of components or sets of instructions are included within memory 118. A processor 120, such as a microprocessor, may also be included in the body portion 104. As will be described in greater detail below, the components or sets of instructions 119 are executable by the processor 120, wherein execution of such components 119 facilitates the subject innovation as well as controlling and/or communicating with one or more of the other components, systems, and modules of the robot. The processor 120 can be in communication with the other components, systems and modules of the robot 100 by way of any suitable interface, such as a bus hosted by a motherboard. In an embodiment, the processor 120 functions as the "brains" of the robot 100. For instance, the processor 120 may be utilized to process data and/or commands received from a remote device as well as other systems and modules of the robot 100, and cause the robot 100 to perform in a manner that is desired by a user of such robot 100.

The body portion 104 of the robot 100 can further include one or more sensors 122, wherein such sensors 122 can include any suitable sensor that can output data that can be utilized in connection with autonomous or semi-autonomous navigation and/or environmental monitoring. For example, the sensors 122 may include a depth sensor, sonar sensor, infrared sensor, a camera, a temperature sensor, a microphone or similar audio sensor and/or audio recorder, temperature sensor, humidity sensor, smoke sensor, a cliff sensor that is configured to detect a drop-off in elevation proximate to the robot 100, a GPS or other location sensor, an accelerometer, a gyroscope, or other types of suitable sensors. Data that is captured by the sensors 122 and the sensors 114 can be provided to the processor 120 which, by executing on or more of the components stored within memory 118, can process the data and autonomously navigate the robot 100 based at least in part upon the data captured by the sensors.

A drive motor 124 may be disposed in the body portion 104 of the robot 100. The drive motor 124 may be operable to drive wheels 126 and/or 128 of the robot 100. For example, the wheel 126 can be a driving wheel while the wheel 128 can be a steering wheel that can act to pivot to change the orientation of the robot 100. Additionally, each of the wheels 126 and 128 can have a steering mechanism to change the orientation of the robot 100. Furthermore, while the drive motor 124 is shown as driving both of the wheels 126 and 128, it is to be understood that the drive motor 124 may drive one of the wheels 126 or 128 while another drive motor can drive the other of the wheels 126 or 128. Upon receipt of data from the sensors 114 and 122 and/or of commands from the remote device (for example, received by way of the antenna 108), the processor 120 can transmit signals to the head rotation module 106 and/or the drive motor 124 to control orientation of the head portion 102 with respect to the body portion 104, and/or to control the orientation and position of the robot 100.

The body portion 104 of the robot 100 can further include speakers 132 and a microphone 134. Data captured by way of the microphone 134 can be transmitted to the remote device by way of the antenna 108. Accordingly, a user at the remote device can receive a real-time audio/video feed and may experience the environment of the robot 100. The speakers 132 can be employed to output audio data to one or more individuals that are proximate to the robot 100. This audio information can be a multimedia file that is retained in the memory 118 of the robot 100, audio files received by the robot 100 from the remote device by way of the antenna 108, or real-time audio data from a web-cam or microphone at the remote device, etc.

While the robot 100 has been shown in a particular configuration and with particular modules included therein, it is to be understood that the robot can be configured in a variety of different manners, and these configurations are contemplated and are intended to fall within the scope of the hereto-appended claims. For instance, the head rotation module 106 can be configured with a tilt motor so that the head portion 102 of the robot 100 can tilt in a vertical direction. Alternatively, the robot 100 may not include two separate portions, but may include a single unified body, wherein the robot body can be turned to allow the capture of video data by way of the video camera 112. In still yet another embodiment, the robot 100 can have a unified body structure, but the video camera 112 can have a motor, such as a servomotor, associated therewith that allows the video camera 112 to alter position to obtain different views of an environment. Modules that are shown to be in the body portion 104 can be placed in the head portion 102 of the robot 100, and vice versa. It is also to be understood that the robot 100 has been provided solely for the purposes of explanation and is not intended to be limiting as to the scope of the hereto-appended claims.

Figure 2:
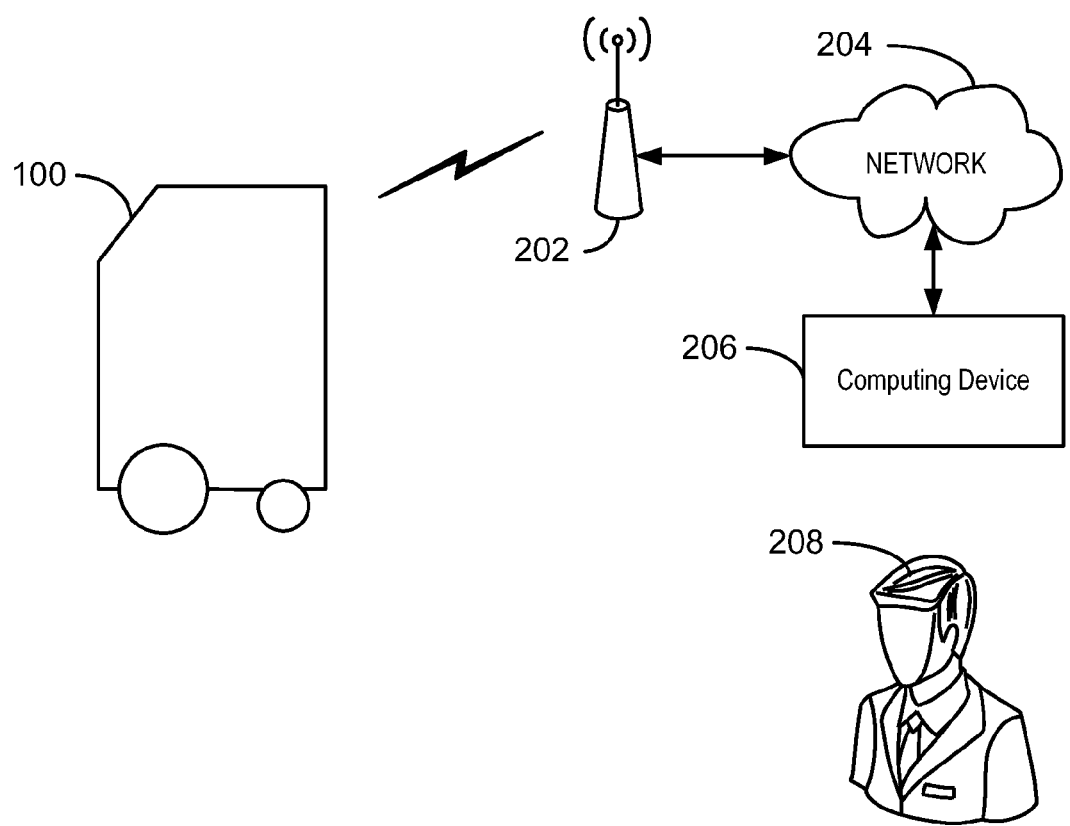
FIG. 2 illustrates an exemplary network environment over which an autonomous device such as a robot and a remote device can communicate.

FIG. 2 shows an environment 200 that facilitates reception by the robot 100 of commands and/or data from, and the transmission by robot 100 of sensor and other data to, one or more remote devices. More particularly, the environment 200 includes a wireless access point 202, a network 204, and a remote device 206. The robot 100 is configured to receive and transmit data wirelessly via antenna 108. In an exemplary embodiment, the robot 100 initializes on power up and communicates with a wireless access point 202 and establishes its presence with such the access point 202. The robot 100 may then obtain a connection to one or more networks 204 by way of the access point 202. For example, the networks 204 may include a cellular network, the Internet, a proprietary network such as an intranet, or other suitable network.

Each of the remote devices 206 can have respective applications executing thereon that facilitate communication with the robot 100 by way of the network 204. For example, and as will be understood by one of ordinary skill in the art, a communication channel can be established between the remote device 206 and the robot 100 by way of the network 204 through various actions such as handshaking, authentication, and other similar methods. The remote devices 206 may include a desktop computer, a laptop computer, a mobile telephone or smart phone, a mobile multimedia device, a gaming console, or other suitable remote device. The remote device 206 can include or have associated therewith a display or touch screen (not shown) that can present data, images, and other information, and provide a graphical user interface to a user 208 pertaining to navigation, control, and the environment surrounding the robot 100. For instance, the robot 100 can transmit a live audio/video feed of its environment to the remote device 206 by way of the network 204, and the remote device 206 can present this audio/video feed to the user 208. As a further example, the robot 100 can transmit information relating to the environment of robot 100 based on data from sensors 114 and 122 received by the processor 120, including temperature, humidity and other data relating to the environment of the robot 100. As a still further example, the robot 100 can also transmit information relating to its movement and/or current location, direction and speed of movement, next destination, and other information relating to location and movement of the robot 100. As will be described below, the user 208 can transmit a variety of commands, including commands related to navigation of the robot 100 and commands for the robot 100 to provide data related to its environment, by way of the remote device 206 via the network 204.

In an exemplary embodiment, the user 208 and the remote device 206 may be in a location that is remote from the robot 100, and the user 208 can utilize the robot 100 to explore an environment of the robot 100. Exemplary purposes for which the user 208 may wish to control the robot 100 remotely include instructing the robot 100 to move to a certain location to provide the user 208 via the remote device 206 with video and/or audio feeds from that location, to determine the temperature and/or humidity at that location, and to check the status of any systems operating in the environment of robot 100, such as heating and ventilation or other environmental systems.

Figure 3:
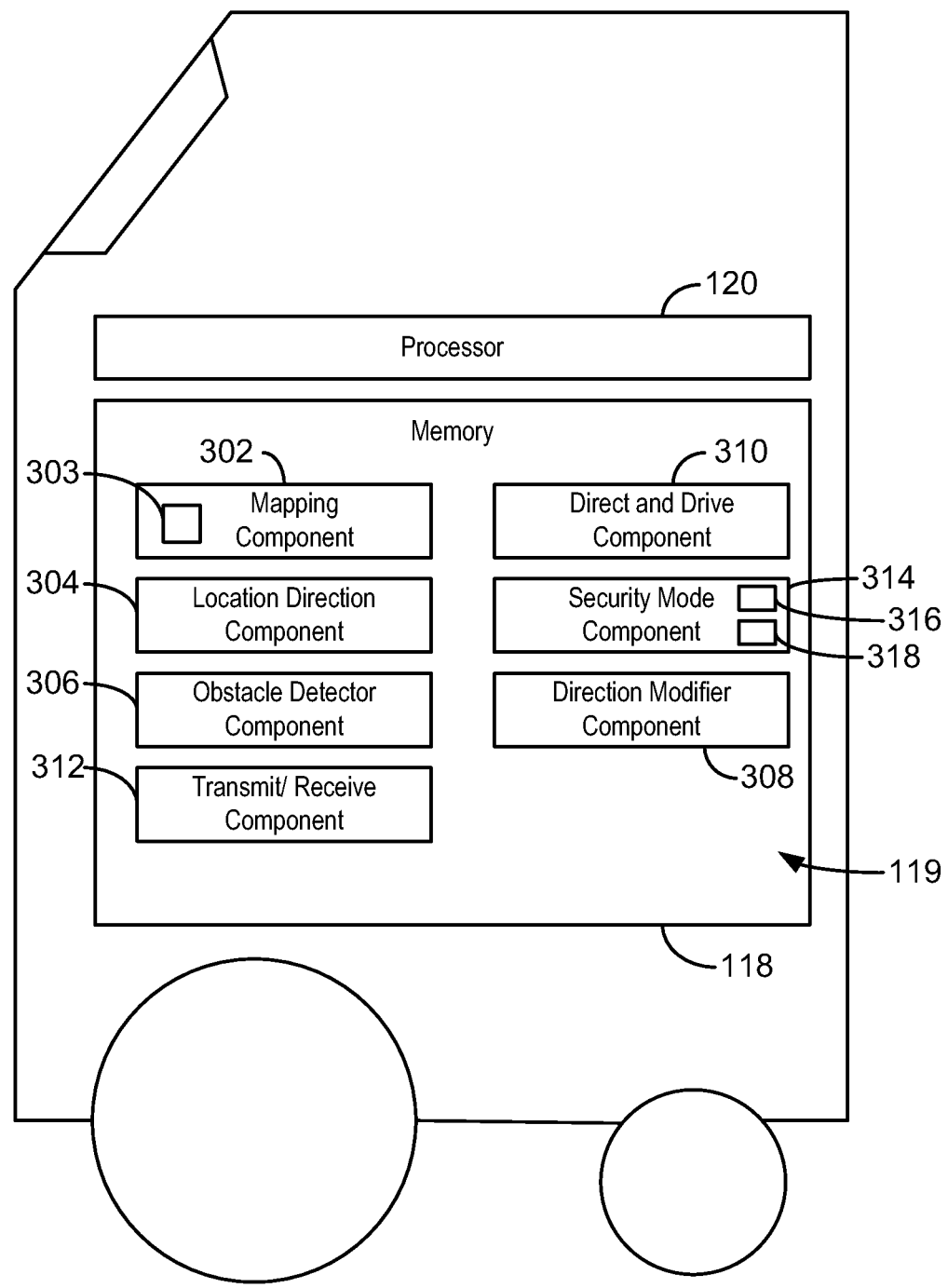
FIG. 3 is a block diagram of a robot embodying the subject innovation.

With reference now to FIG. 3, an exemplary depiction of the robot 100 is illustrated. As described above, the robot 100 includes the processor 120 and the memory 118. The memory 118 includes a number of components 119 that are executable by the processor 120, wherein certain of such components are configured to provide a number of different navigation modes for the robot 100. The navigation modes that are supported by the robot 100 include what can be referred to herein as a "location direct" navigation mode, a "direct and drive" navigation mode, and an "autonomous" or "security mode" of navigation. The navigation modes are selectable by user 208 either directly on robot 100 or via remote device 206. The components in the memory 118 that support these modes of navigation will now be described.

The components 119 of memory 118 may include a mapping component 302. The mapping component 302 can be used in defining one or more maps 303 that indicate the location of certain objects, rooms, real and virtual boundaries, and/or the like of the environment. Alternatively, the mapping component 302 can be configured to automatically generate map 303 by causing the robot 100 to navigate through the environment and automatically generate map 303 based at least in part upon the data gathered from sensors 114 and 122. In a particular embodiment, the robot 100 can transmit the map 303 to the remote device 206, and the user 208 can assign tags or names and other attributes, including virtual boundaries, to locations on the map 303 using the remote device 206. The remote device 206 can provide the user 208 with a graphical user interface that includes a depiction of the map 303 and/or a list of tagged locations, and the user can select a tagged location in the map 303. Alternatively, the user 208 can select an untagged location in the map 303.

The components 119 of memory 118 may also include mobility components such as a location direction component 304 that receives a selection of a tagged or untagged location in the map 303 from the user 208. The location direction component 304 can treat the selected location as a node, and can compute a path from a current position of the robot 100 to the selected location or the corresponding node. For instance, the map 303 can be interpreted by the robot 100 as a number of different nodes, and the location direction component 304 can compute a path from a current position of the robot 100 to the node, wherein such path is through multiple nodes. In an alternative embodiment, the location direction component 304 can receive the selection of the tagged or untagged location in the map and translate coordinates corresponding to that selection to coordinates corresponding to the environment of the robot 100 (e.g., the robot 100 has a concept of coordinates on a floor plan). The location direction component 304 can then cause the robot 100 to travel to the selected location. With more specificity, the location direction component 304 can receive a command from the remote device 206, wherein the command includes an indication of a selection by the user 208 of a tagged or untagged location in the map 303. The location direction component 304, when executed by the processor 120, can cause the robot 100 to travel from its current position in the environment to the location in the environment that corresponds to the selected location in the map 303.

As the robot 100 is traveling towards the selected location, one or more obstacles may be in a path that is between the robot 100 and the selected location. The components 119 of memory 118 can include an obstacle detector component 306 that, when executed by the processor 120, is configured to analyze data received from the sensors 114 and/or the sensors 122 and detect obstacles not appearing on map 303 or otherwise not known to robot 100. Upon detecting an unknown or unexpected obstacle in the path of the robot 100 between the current position of the robot 100 and the selected location, the obstacle detector component 306 can output an indication that such obstacle has been detected as well as an approximate location of the obstacle with respect to the current position of the robot 100. A direction modifier component 308 can receive this indication and, responsive to receipt of the indication of the existence of the obstacle, can cause the robot 100 to alter its course (direction) from its current direction of travel to a different direction of travel to avoid the obstacle. The location direction component 304 together with the obstacle detector component 306, the direction modifier component 308, and the sensors 114 and 118, can thus be collectively utilized for autonomously driving the robot 100 to the location in the environment that was selected by the user 208 through, for example, a single mouse-click by the user 208.

Further, in an exemplary embodiment, the obstacle detector component 306 may be configured to detect unexpected or unusual conditions present in the environment of robot 100, such as temperature, humidity, and sounds that are outside certain normal or expected ranges. The obstacle detector component 306 may be configured to analyze data from sensors 114 and 122 for certain locations on the map 303, such as the tagged locations, and over time compile an average or expected range of sensor readings for each location. The obstacle detector component 306 can be further configured to continuously or periodically analyze current data from sensors 114 and 122 to determine whether that sensor data falls outside historical average or normal values or expected ranges of values, such as a sound that exceeds an expected loudness or sound pressure level that may indicate an unusual condition or a malfunctioning system.

In response to the detection of an unknown obstacle or unusual condition, the robot 100 may be configured to autonomously, or the user 208 may via the remote device 206 operate the robot 100 to manually, take a variety of actions, including taking a picture or video of the unexpected or unknown obstacle and transmitting same for display on the remote device 206 to the user 208. In yet another embodiment, upon detecting an unexpected obstacle, the obstacle detector component 306 may be configured to analyze data from the sensors 114 and 122 to determine the characteristics of the detected obstacle, including, for example, the size, shape, infrared profile and temperature of the detected obstacle as well as whether the detected obstacle is moving, stationary, or emitting sound, and to compare those characteristics against the characteristics of known objects stored in memory 118 to thereby identify or otherwise classify the detected object, for example, as a human, animal or pet, or as various animate and inanimate objects, or other appropriate classifications.

The obstacle detector component 306 can further be configured upon detection of an unexpected or unknown obstacle or an unusual condition to send an alert to the remote device 206, via the access point 202 and the network 204, and thereby alert the user 208 to the condition. Further, the classification of the detected obstacle may also be sent to remote device 206, via the access point 202 and network 204, for presentation to the user 208.

For clarity, the term unusual condition as used herein shall encompass unknown or unexpected obstacles as well as unusual or unexpected environmental conditions or occurrences. Similarly, the term unknown or unexpected obstacles as used herein shall encompass unusual or unexpected environmental conditions as well as unknown or unexpected obstacles.

The memory 118 may also include a mobility component such as a direct and drive component 310 that supports the "direct and drive" navigation mode. As described previously, the robot 100 may include the video camera 112 that can transmit a live video feed to the remote device 206, and the user 208 of the remote device 206 can be provided with this live video feed in a graphical user interface. With more specificity, the components 119 of memory 118 can include a transmitter/receiver component 312 that is configured to transmit and receive data by way of the antenna 108 and/or wireless access point 202 and network 204. Thus, transmitter/receiver component 312 is configured to receive a live video feed from the video camera 112, and cause the live video feed to be transmitted from the robot 100 to the remote device 206 by way of the antenna 108 and/or wireless access point 202 and network 204. Additionally, the transmitter/receiver component 312 can also be configured to cause a live audio feed to be transmitted to the remote device 206. The user 208 can select through a gesture or utilization of a mouse or touch sensitive display, for example, a portion of the live video feed that is being presented on remote device 206, and the selection of this portion of the live video feed can be transmitted back to the robot 100. The direct and drive component 310 can receive the selection of a particular portion of the live video feed.

For instance, the selection may be in the form of coordinates on the graphical user interface of the remote computing device 206, and the direct and drive component 310 can translate such coordinates into a coordinate system that corresponds to the environment of the robot 100. The direct and drive component 310 can compare the coordinates corresponding to the selection of the live video feed received from the remote computing device 206 with a current position/point of view of the video camera 112. If there is a difference in such coordinates, the direct and drive component 310 can cause a point of view of the video camera 112 to be changed from a first point of view (the current point of view of the video camera 112) to a second point of view, wherein the second point of view corresponds to the location in the live video feed selected by the user 208 at the remote computing device 206. For instance, the direct and drive component 310 can be in communication with the head rotation module 106 such that the direct and drive component 310 can cause the head rotation module 106 to rotate and or tilt the head portion 102 of the robot 100 such that the point of view of the video camera 112 corresponds to the selection made by the user 208 at the remote computing device 206.

The transmitter/receiver component 312 causes the live video feed to be continuously transmitted to the remote computing device 206—thus, the user 208 can be provided with the updated video feed as the point of view of the video camera 112 is changed. Once the video camera 112 is facing a direction or has a point of view that is desired by the user 208, the user 208 can issue another command that indicates the desire of the user for the robot 100 to travel in a direction that corresponds to the current point of view of the video camera 112. In other words, the user 208 can request that the robot 100 drive forward from the perspective of the video camera 112. The direct and drive component 310 can receive this command and can cause the drive motor 124 to orient the robot 100 in the direction of the updated point of view of the video camera 112. Thereafter, the direct and drive component 310, when being executed by the processor 120, can cause the drive motor 124 to drive the robot 100 in the direction that has been indicated by the user 208.

The robot 100 can continue to drive or travel in this direction until the user 208 indicates that she wishes that the robot 100 cease traveling in such direction. In another example, the robot 100 can continue to travel in this direction unless and until a network connection between the robot 100 and the remote computing device 206 is lost. Additionally or alternatively, the robot 100 can continue traveling in the direction indicated by the user until the obstacle detector component 306 detects an obstacle that is in the path of the robot 100. Again, the obstacle detector component 306 can process data from the sensors 114 and/or 122, and can output an indication that the robot 100 will be unable to continue traveling in the current direction of travel. The direction modifier component 308 can receive this indication and can cause the robot 100 to travel in a different direction to avoid the obstacle. Once the obstacle detector component 306 has detected that the obstacle has been avoided, the obstacle detector component 306 can output an indication to the direct and drive component 310, which can cause the robot 100 to continue to travel in a direction that corresponds to the point of view of the video camera 112.

In a first example, the direct and drive component 310 can cause the robot 100 to travel in the direction such that the path is parallel to the original path that the robot 100 took in accordance with commands output by the direct and drive component 310. In a second example, the direct and drive component 310 can cause the robot 100 to encircle around the obstacle and continue along the same path of travel as before. In a third example, the direct and drive component 310 can cause the robot 100 to adjust its course to avoid the obstacle (such that the robot 100 is travelling over a new path), and after the obstacle has been avoided, the direct and drive component 310 can cause the robot to continue to travel along the new path. Accordingly, if the user desires that the robot 100 continue along an original heading, the user can stop driving the robot 100 and readjust the heading.

The components 119 of memory 118 can further include a security mode component 314 that the user 208 can activate, either directly on robot 100 or via a graphical user interface displayed on remote device 206. Once activated, the security mode component 314 can cause the robot 100 to enter a security mode of operation wherein the robot 100 navigates in a security mode of navigation. In the security mode of navigation, the robot autonomously navigates through one or more predetermined paths 316, which may include one or more random paths, within its entire environment or within one or more predetermined portions 318 of its environment. The robot 100 may autonomously navigate the predetermined paths 316 a single time or iteratively. The predetermined navigation paths 316 as well as the one or more predetermined portions 318 of the environment to be navigated can be selected by the user 208 either directly on the robot 100 or via a graphical user interface displayed on the remote device 206. The one or more predetermined navigation paths 316 and predetermined portions 318 of the environment to be navigated can be preprogrammed by user 208 utilizing mapping component 302 in order to tag locations on map 303, and the navigation paths 316 and predetermined portions 318 can be stored in memory 118. The security mode component 314 may be configured to generate, by utilizing mapping component 302, one or more predetermined navigation paths 316 that are random paths by utilizing mapping component 302 in order to tag random locations on map 303 within the entire environment or within the predetermined portions 318 thereof, as appropriate.

The predetermined navigation paths 316 encompassing predetermined portions 318 of the environment enable the robot 100 to conduct sensitive patrols of its environment when in the security mode of operation. For example, the environment of the robot 100 may be a residence that includes rooms or other portions that are occupied by residents who do not wish to be disturbed or may desire privacy, which portions are taken into consideration and may be excluded from one or more of the predetermined navigation paths 316 and/or the predetermined portions 318 of the environment to be navigated by the robot 100. In an exemplary embodiment, the predetermined navigation paths 316 and/or the predetermined portions 318 do not include the areas of the environment that may be occupied by residents desiring privacy. Such predetermined paths 316 and/or the predetermined portions 318 may also be associated with and be automatically activated during certain time periods, such as during the hours the residents may be sleeping, by the security mode component 314.

In an exemplary embodiment, security mode component 314 may cause the robot 100 to automatically navigate autonomously to the origin of any unexpected condition detected by obstacle detector component 306 or sensors 114 and 122. More particularly, when the obstacle detection component 306 via the sensors 114 or 122 detects an unexpected or unusual condition, security mode component 314 may be configured to note the location or estimate, such as by triangulation or other method, the origin of the unexpected condition within the environment. Security mode component 314 may then invoke the mapping component 302 to thereby tag the location on map 303 of the origin of the unexpected condition, and then invoke the location direction component 304 to navigate to that location. The security mode component 314 may also be configured to automatically invoke the transmitter/receiver component 312 to transmit and/or record video and/or audio, via video camera 112 and/or microphone 134, when the robot 100 approaches the origin of the unexpected condition. Further, in yet another exemplary embodiment, the security mode component 314 may be configured to invoke the transmitter/receiver component 312 and automatically alert the user 208 and/or take other action, such as, for example, issuing an alert to a fire or police department, in response to the detection and characterization of any unexpected obstacles by the obstacle detector component 306 or in response to any noises or other unusual conditions detected by sensors 114 and 122.

In yet another exemplary embodiment, the security mode component 314 may be configured to characterize the detected unusual condition by analyzing data from the sensors 114 and 122 to determine the characteristics of the detected obstacle or unusual condition including, for example, the size, shape, infrared profile and temperature of the detected obstacle as well as whether the detected obstacle is moving, stationary, or emitting sound, and to compare those characteristics against the characteristics of known objects stored in memory 118 to thereby identify or otherwise classify the detected object as, for example, a human, animal or pet, or as various animate and inanimate objects, or other appropriate classifications.

When security mode component 314 is activated and the robot 100 is operating in the security mode of operation, security mode component 314 has access to and may cause processor 120 to execute any of the other components 119 of memory 118, including the map 303, the location direction component 304, the obstacle detector component 306 and the transmitter/receiver component 312. Thus, the user 208 may utilize or invoke, for example, the location direction component 304 when the robot 100 is operating in the security mode and thereby suspend the security mode of autonomous navigation to drive the robot 100 to a location in the environment that was selected by the user 208 by, for example, a single mouse-click on the map 303. Utilization of the location direction component 304 when the robot 100 is operating in the security mode of operation may be activated by the user 208 upon, for example, robot 100 detecting and alerting the user 208 of an unexpected obstacle, a high temperature reading, or an unusual noise, thereby enabling the user 208 to directly navigate the robot 100 to investigate the origin of the unexpected condition.

Figure 4:
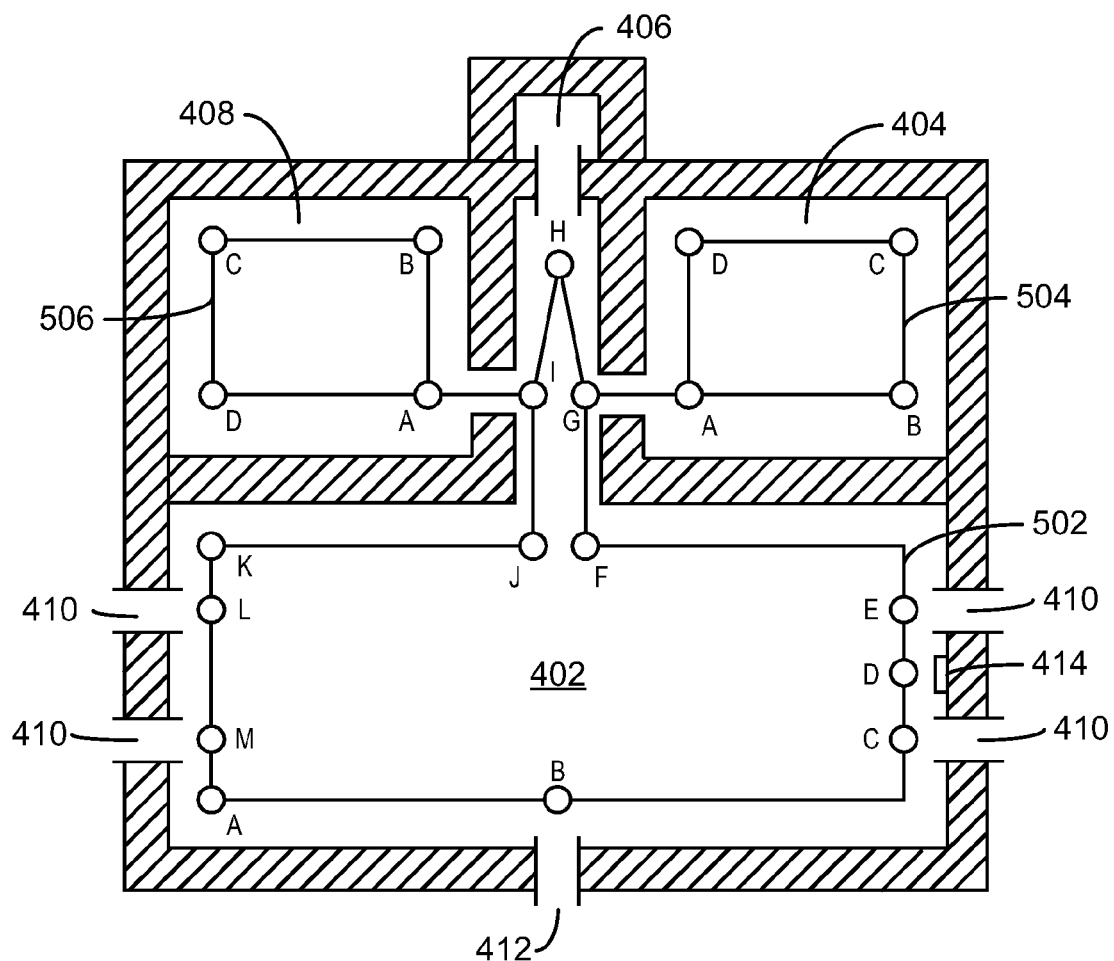
FIG. 4 is a diagram illustrating navigation paths of the robot of FIG. 3.

With reference now to FIG. 4, exemplary paths to be traversed by robot 100 are illustrated within an exemplary environment 400. Environment 400 includes areas 402, 404, 406 and 408. Area 402 may include windows 410, an entrance door 412 and a system 414, such as, for example, a thermostat, oven, telephone, computer or any other system. In an exemplary embodiment, area 406 is an area designated as private and, as such, is desired to be excluded from a navigation path of robot 100, and areas 404 and 408 are designated as semi-private areas that are to be excluded from a path of robot 100 during certain time periods. Accordingly, a first exemplary navigation path 502 of robot 100 excludes areas 404, 406 and 408. The robot 100 may traverse the path 502 along the sequence of 502A-B-C-D-E-F-G-H-I-J-K-L-M-A. In an exemplary embodiment, robot 100 may pause at certain points of path 502, for example, points that are proximate to windows 410 and entrance door 412, such as points 502B, C, E, L and M, and take certain predetermined actions including, for example, taking a video image via video camera 112 of windows 410 and door 412 for transmission via transmitter/receiver component 314 for presentation to the remote user 208 on the remote device 206.

A second exemplary navigation path of the robot 100 includes, but diverges from, the first navigation path 502. More particularly, the second navigation path includes paths 502, 504 and 506. The second navigation path diverges from path 502 at 502G to traverse path 504 along the sequence 504A-B-C-D-A and joins again path 502 at 502G to traverse path 502 along the sequence 502G-H-I, and again diverges from path 502 at 502I to traverse path 506 along the sequence of 506A-B-C-D-A and joins again path 502 at 502I to traverse path 502 along the sequence 502I-J-K-L-M-A. As the second path includes semi-private areas 404 and 408, the security mode component 314 may cause robot 100 to traverse the second path under certain conditions, such as during working hours when environment 400 is not likely to be occupied, when user 208 selects the second navigation path, or when an unexpected condition is detected while security mode component is active and the robot 100 is operating in the security mode of operation.

From the foregoing, it is made clear that the security mode component 314 enables robot 100 to achieve a relatively high-level of security with a fewer number of security system components than can be achieved by a conventional security system, which requires separate security system components be located in each area of a premises or environment that is to be monitored. Further, the security mode component 314 enables robot 100 to exclude from its navigation path areas that are desired to be or are designated as private and semi-private areas. Thus, the security mode component 314 enables the robot 100 to achieve a relatively high-level of security while being less intrusive than conventional security systems.

Figure 5:
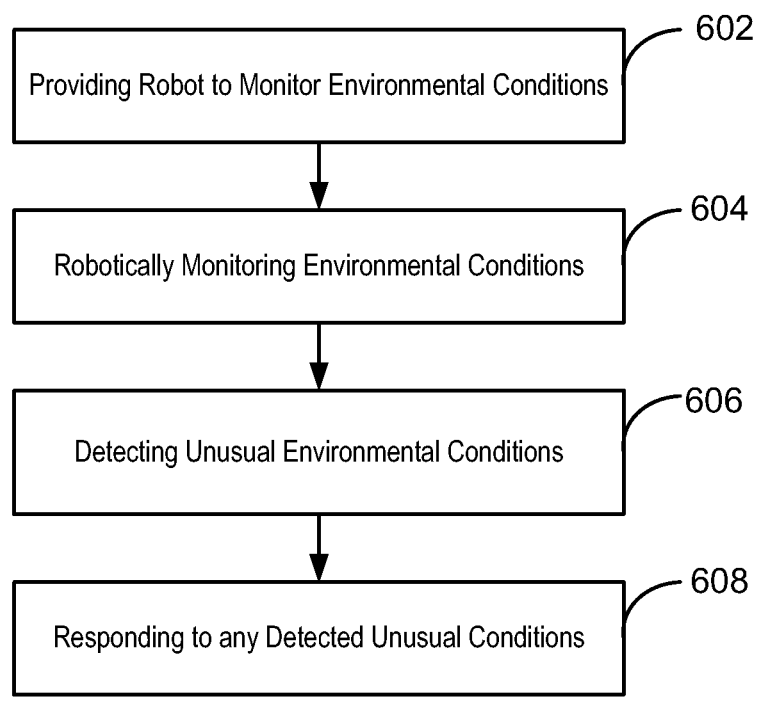
FIG. 5 is a block diagram that illustrates an exemplary method for robotically monitoring an environment.

FIG. 5 is a process flow diagram of a method 500 for robotically monitoring an environment. The method 500 includes providing a robot configured to monitor certain environmental conditions 502, robotically monitoring those certain conditions within the environment 504, detecting unusual conditions within the environment 506, and responding to any detected unusual conditions 508.

Providing a robot configured to monitor certain environmental conditions 502 includes configuring a robot to sense environmental conditions. The robot may be equipped with a processor, such as a microprocessor, memory readable by the processor, and a number of sensors that aid the robot in monitoring its environment. The memory may store components that are executable by the processor, whereby execution of the components by the processor facilitate monitoring of the environment by the robot, including robot navigation, reading of sensor data, analysis of the sensor data, and reporting unusual conditions indicated by the sensor data. For example, the robot may be equipped with sensors including a depth sensor, an infrared sensor, a camera, a temperature sensor, a microphone or similar audio sensor, a temperature sensor, a humidity sensor, a smoke sensor, a GPS or other location sensor, an accelerometer, a gyroscope, or other types of suitable sensors, that provide the processor with sensor data.

Robotically monitoring conditions within the environment 504 includes the sensors providing data pertaining to the environment being monitored to the processor of the robot. In an exemplary embodiment of the method 500, monitoring conditions within the environment 504 includes the robot autonomously navigating one or more paths through the environment to be monitored, or portions thereof, which paths may be predetermined by a user tagging locations on a map stored in the robot memory, and reading data from the sensors at various points along the path being navigated. In another embodiment, robotically monitoring conditions within the environment 504 includes a user manually navigating the robot, such as, for example, via a remote device in communication with and configured to control the robot, to one or more locations within the environment at which the user desires to monitor environmental conditions.

In a further exemplary embodiment, robotically monitoring conditions within the environment 504 includes compiling expected or normal environmental characteristics, including normal or expected values or ranges of values for temperature, humidity, sound pressure levels, and the location of objects such as walls or boundaries, furniture, appliances, systems, and other items present within the environment generally or at certain locations within the environment. The normal or expected environmental conditions for each location within the environment for which sensor data is taken may be stored in the memory of the robot.

Robotically monitoring conditions within environment 504 may further include the processor of the robot executing one or more components residing in the memory of the robot that include a component configured to cause the robot to autonomously navigate one or more paths through the environment to be monitored, and to read sensor data and compile the normal or expected environmental characteristics. The robot may navigate the one or more paths iteratively to compile over time the normal or expected environmental conditions.

Detecting unusual environmental conditions 506 includes reading current sensor data and determining whether that current sensor data corresponds to an environmental condition that lies within or outside of an expected value or range of values, or otherwise indicates an unexpected or unusual condition, such as an unexpected item or obstacle within the environment. For example, the current sensor data may indicate temperature values of the environment that fall within an anticipated or expected range, and yet indicate the occurrence of a sound that exceeds an anticipated or expected loudness or sound pressure level, or indicates the presence of an unexpected object or obstacle. Detecting unusual environmental conditions 506 may include the processor of the robot executing one or more components residing in the memory of the robot that include a component configured to compare current sensor data with the expected values or ranges of values for a given location within the environment being monitored.

Responding to any detected unusual conditions 508 may include the robot taking a variety of actions, including identifying or estimating the origin of the unusual or unexpected condition on map 303 and navigating to that location, and upon arrival at that location the robot may automatically commence transmission of a video/audio feed to transmit and/or record video and/or audio. Further, responding to any detected unusual conditions 508 may include the robot automatically issuing alerts to, for example, a user, fire or police department, or other third party. In an exemplary embodiment, responding to any detected unusual conditions 508 may include characterization of the detected unusual condition by the robot analyzing data from the sensors of the robot to determine the characteristics of the detected obstacle or unusual condition including, for example, the size, shape, infrared profile and temperature of the detected obstacle as well as whether the detected obstacle is moving, stationary, or emitting sound, and compare those characteristics against the characteristics of known objects to thereby identify or otherwise classify the detected object as, for example, a human, animal or pet, or as various animate and inanimate objects, or other appropriate classifications. Responding to any detected unusual conditions 508 may include the processor of the robot executing one or more components residing in the memory of the robot that include a component configured to cause the robot to navigate to the location of the detected unusual condition, issue alerts, and characterize the detected unusual condition.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A device, comprising:
   a processor of the device;
   a plurality of sensors of the device, each of the sensors providing respective sensor data to the processor, the respective sensor data being indicative of corresponding characteristics of an environment of the device; and
   a memory of the device including a security mode component executable by the processor and configured to cause the device to:
      autonomously navigate at least a portion of the environment, and a detection component executable by the processor;
      autonomously detect an unusual condition in the environment based at least in part upon a comparison between the characteristics currently sensed at a particular location of a plurality of locations within a navigation environment and the compiled expected value or range of values for the characteristics at that particular location, wherein the expected value or range of expected values is based on prior sensor readings for each location;
      receive a command from a user indicating travel that corresponds with a current point of view of a camera of the device; and
   a mapping component of the memory device executable by the processor and configured for generating a map of the environment, the map indicating conditions within the environment, location of certain objects, and virtual boundaries associated with privacy conditions for the virtual boundaries.

2. The device of claim 1, wherein the plurality of sensors includes at least one of a depth sensor, an infrared sensor, a camera, a temperature sensor, a motion sensor, a geo-locating sensor, an altitude sensor, compass, air pressure sensor, an audio sensor, a sonar sensor, a temperature sensor, a humidity sensor, a smoke sensor, a cliff sensor, a global positioning sensor, an accelerometer, and a gyroscope.

3. The device of claim 1, wherein the mapping component is configured to generate the map based on user input, the sensor data, or a combination of user input and the sensor data.

4. The device of claim 1, wherein the security mode component is configured to issue an alert upon detection of the unusual condition.

5. The device of claim 4, wherein the security mode component is further configured to invoke a mapping component to tag a location on the map corresponding to the unusual condition, and to cause the device to navigate to a location of the unusual condition.

6. The device of claim 5, wherein the security mode component is further configured to activate at least one of the sensors as the device approaches the location of the unusual condition.

7. The device of claim 1, comprising a transmitter/receiver component executable by the processor and configured to transmit an alert of the unusual condition, the security mode component being further configured to activate the transmission component to cause the transmission of the alert as the device approaches the location of the unusual condition.

8. The device of claim 1, wherein the security mode component is configured to, via a mapping component, generate one or more navigations paths.

9. The device of claim 8, wherein the map includes portions of the environment designated as private or semi-private portions, the navigations paths including certain navigation paths that exclude one or more of the private and semi-private portions.

10. The device of claim 9, wherein the security mode component is configured to cause the device to navigate the certain navigation paths during one of certain time periods and the existence of certain specified conditions.

11. The device of claim 8, wherein the navigation paths include certain points at which security mode component causes the device to activate one or more of the sensors.

12. The device of claim 11, wherein the certain points include at least one of a door, a window and a system, and wherein activating one or more of the sensors comprises activating a video camera to capture video images of the certain points.

13. The device of claim 12, further comprising a transmitter/receiver component executable by the processor and configured to transmit the video images of the certain points to a remote device, the security mode component being further configured to activate the transmitter/receiver component to cause transmission of the video images of the certain points to the remote device.

14. The device of claim 1, wherein the security mode component is configured to automatically notify a user, one or more designated third parties, or combinations thereof upon detection of the unusual condition.

15. The device of claim 14, further comprising a transmitter/receiver component executable by the processor, the security mode component being configured to cause the transmitter/receiver component to transmit a notification upon detection by the detection component of the unusual condition.

16. The device of claim 1, comprising a mobility component that conveys the device by changing the position and orientation of the device as well as the orientation of the sensors.

17. The device of claim 1, the memory device further comprising an obstacle detector component executable by the processor and configured to analyze data received from the sensors and detect obstacles not appearing on the generated map.

18. One or more computer-readable storage media comprising code that, when executed by a processor of an autonomous device, cause the autonomous device to perform acts comprising:
   navigating along one or more navigation paths to various locations within an environment;
   sensing characteristics of the environment at each of the locations;

compiling expected values and ranges of values for each of the sensed characteristics for each location of the various locations within a navigation environment;

autonomously detecting an unusual condition based at least in part upon a comparison between the characteristics currently sensed at a particular location of the various locations within the navigation environment and the compiled expected value or range of values for the characteristics at that particular location;

responding to the detection of an unusual condition by sending a notification of the detected unusual condition to thereby alert a remote user;

receive a command from a user indicating travel that corresponds with a current point of view of a camera of the device; and generate a map of the environment, the map indicating conditions within the environment, location of certain objects, and virtual boundaries associated with privacy conditions for the virtual boundaries.

19. The computer-readable storage medium comprising instructions of claim 18, wherein detecting an unusual condition includes characterizing the detected unusual condition, and wherein the notification includes the characterizing information.

20. A method of monitoring an environment, comprising:

providing a robot, the robot carrying a plurality of sensors along a navigation path, the sensors sensing characteristics of the environment at various locations along the navigation path;

autonomously detecting an unusual condition based at least in part upon a comparison between the characteristics currently sensed at a particular location within a navigation environment and an expected value or range of values for the characteristics at that particular location, wherein the expected value or range of expected values is based on prior sensor readings for each location;

responding to the detection of an unusual condition by sending to a user a notification of the detected unusual condition;

receive a command from a user indicating travel that corresponds with a current point of view of a camera of the device; and generate a map of the environment, the map indicating conditions within the environment, location of certain objects, and virtual boundaries associated with privacy conditions for the virtual boundaries.

* * * * *